Feb. 28, 1967 G. W. KAHLE 3,306,408
HYDRAULICALLY ENGAGED CLUTCH WITH DUAL SPRING
MEANS AND MODULATING VALVE
Filed Feb. 12, 1965

INVENTOR.
G. W. KAHLE

BY John M. Nolan

ATTORNEY

United States Patent Office 3,306,408
Patented Feb. 28, 1967

3,306,408
HYDRAULICALLY ENGAGED CLUTCH WITH DUAL SPRING MEANS AND MODULATING VALVE
Glenn W. Kahle, Moline, Ill., assignor to Deere & Company, Moline, Ill., a corporation of Delaware
Filed Feb. 12, 1965, Ser. No. 432,272
11 Claims. (Cl. 192—85)

This invention relates to hydraulically actuated friction clutches and more particularly to means for reducing the abruptness of engagement of such clutches.

In a conventional hydraulically actuated friction clutch, the clutch friction plates are pressed into engagement by a hydraulically actuated piston, the fluid pressure being conventionally controlled by a manually actuated control valve. In such a clutch, the torque output is very sensitive to the amount of hydraulic pressure on the engaging piston. However, when the engaging piston is moving toward the clutch elements, there is a flow of fluid into the hydraulic cylinder which results in a pressure drop between the control valve and the cylinder. When the piston compresses the stacked clutch elements to their solid height just prior to clutch engagement, piston movement ceases, eliminating the pressure drop. Consequently, the cylinder pressure suddenly rises, causing an abrupt clutch engagement.

This characteristic abrupt clutch engagement is, of course, undesirable since it puts added stress on the power train components and is especially undesirable in a vehicle such as a tractor where gradual and limited clutch engagement is frequently desired to inch the vehicle.

To overcome this objection, previous mechanisms have been devised to retard the rate of clutch engagement, such as described in U.S. Patent No. 2,702,618, S. W. Baker et al., issued February 22, 1955, wherein a relief valve in the engaging piston gradually closes to provide a retarded pressure buildup, and U.S. Patent No. 3,054,491, P. Bloch et al., issued September 18, 1962, wherein the movement of the engaging piston is under throttling control and spring restrained to retard the engaging pressure. However, in each of said patents, clutch torque is a function of time after the control valve is opened and consequently the operator does not have the proper feel on the controls.

The present invention is an improvement in such devices and utilizes a modulating type control valve wherein the valve output pressure is a function of the valve actuating movement, such as is applied through the travel of a clutch pedal. Dual springs are then used in the clutch to oppose the engaging movement of the piston, the first spring opposing the piston travel to a point just before clutch engagement where the second preloaded spring also resists piston movement until the oil flow and consequently the pressure drop substantially disappears. Thus, the clutch engaging pressure is proportional to the valve actuating movement, allowing the operator to control the rate of engaging pressure application.

Accordingly, the primary object of the invention is to provide a hydraulically actuated friction clutch having improved engaging characteristics.

A more specific object is to eliminate abrupt clutch engagement by substantially eliminating the flow of actuating fluid during the clutch engagement.

Another object is to provide such a clutch with spring means to prevent engagement of the clutch while there is a substantial flow of actuating fluid, and more specifically to provide such a clutch with dual springs for resisting the engaging piston, whereby the second spring engages the piston just prior to clutch engagement to resist further piston movement in conjunction with the first spring until fluid flow has substantially terminated and an elevated actuating pressure is attained.

Another object is to provide such a clutch in which the output torque is a function of the position of the manually actuated pressure control valve so as to give the operator the proper feel on the clutch.

Another object is to utilize a modulating type valve to control the hydraulic pressure which actuates the clutch. Still another object is to provide such a clutch and control valve of simple but rugged construction, inexpensive to manufacture and maintain.

These and other objects of the invention will become apparent from a consideration of the following detailed description and accompanying drawings wherein.

Figure 1:
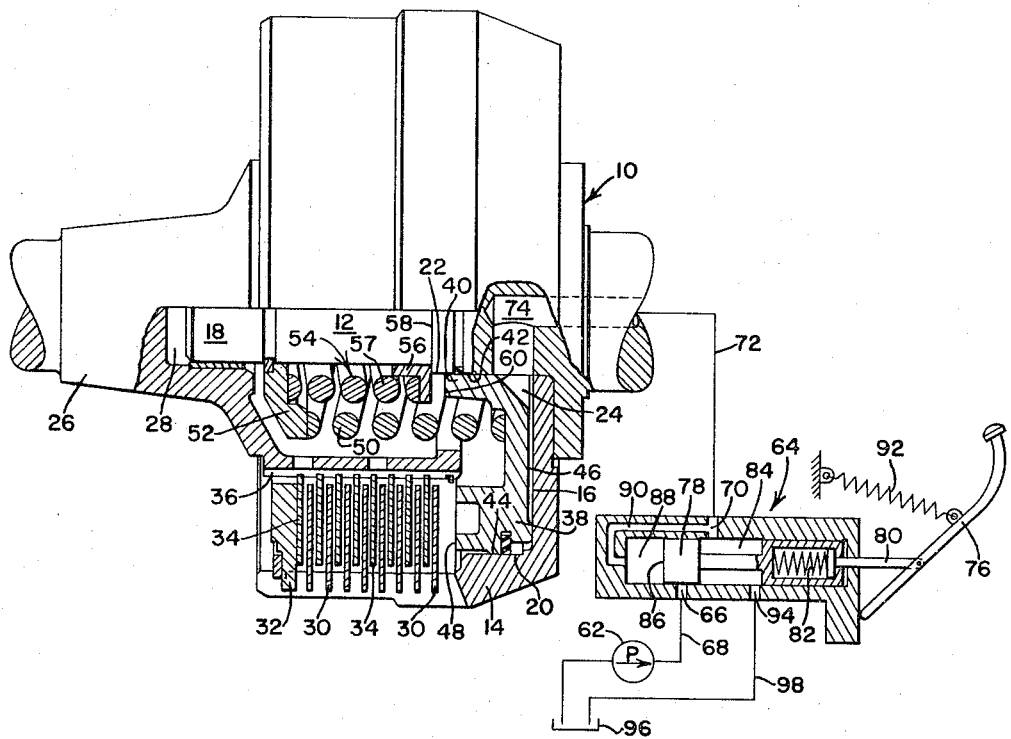
FIG. 1 is an elevation view of the improved clutch, partly in section, with a schematic view of the hydraulic control system, showing the clutch in a disengaged position.

In the drawings there is shown a hydraulically actuated clutch having a rotatable drive member 10 which includes a central shaft 12 and a cup-shaped portion or drum 14 coaxially affixed to the shaft 12 and having an interior radial face 16 axially spaced from the shaft end 18. The inner periphery 20 of the drum, the radial face 16, and the outer periphery 22 of the shaft 12 form an annular cylinder 24.

A rotatable driven member 26 coaxially extends into the drum 14 and includes an axial bore 28 in which the shaft end 18 is journaled. A plurality of annular clutch members or friction plates 30 are coaxially mounted on the inner periphery 20 of the drum 14 for limited axial movement only relative thereto, the axial movement of the friction plates toward the open end of the drum being limited by a stop means or backing ring 32 projecting from the inner periphery of the drum adjacent the open end thereof. A plurality of similar annular friction plates or clutch members 34 are coaxially splined to the outer periphery 36 of the driven member 26 for limited axial movement relative thereto. The friction plates 30 and 34 are stacked in an alternating relationship.

An annular piston 38, having a hub 40 with an axial bore 42 which accommodates the shaft 12, is slidably mounted in the cylinder 24 and its outer periphery 44 has an appropriate seal engaging the inner periphery 20 of the cylinder. The piston has one radial face 46 opposing the end face 16 and an opposite radial face 48 adjacent to the friction plates 30 and 34.

When the piston 38 is in a clutch disengaging position as shown in FIG. 1, the radial face 48 is axially spaced from the friction plates. When the piston moves axially in response to fluid pressure in the cylinder 24 to a clutch-engaging position as shown in FIG. 2, the radial face 48 seats against the friction plates and axially compresses them against the stop means 32, engaging the clutch so that the drive and driven members rotate in unison.

A first spring means 50, here shown as a helical compression spring, coaxially loosely surrounds the shaft 12 and acts between a retaining member or stop 52 and the piston 38 to bias the piston toward its clutch-disengaging position.

A second spring means 54 coaxially encircles the shaft 12 within the first spring means 50 and includes a sleeve 56 slidably mounted on the shaft 12 at one end of a helical compression spring 57, the other end of the spring 57 seating against the retaining member 52. The axial movement of the sleeve 56 and consequently the expansion of the spring means 54 toward the piston 38 is limited by a stop means 58, here a shoulder on the shaft 12. Since the distance between the stop means 58 and the retaining member 52 is less than the free length of the second spring means 54, the second spring means is preloaded to resist axial compression until a predetermined force is applied.

Figure 2:
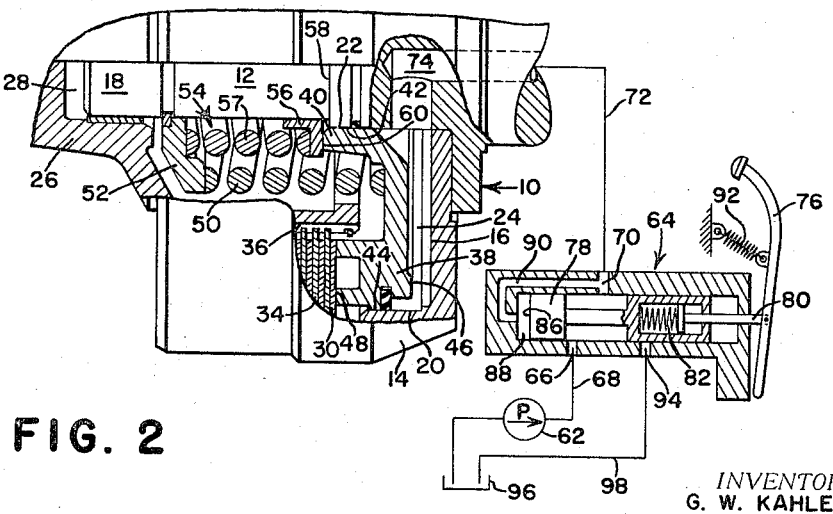
FIG. 2 is a view similar to FIG. 1, omitting a portion of the clutch and showing the clutch in an engaged position.

A radial face 60 on the hub 40 of the piston 38 engages the sleeve 56 during the axial movement of the piston 38 toward its clutch-engaging position a relatively short, predetermined distance before the piston reaches said position and compresses the stacked friction plates 30 and 34 to their solid height as shown in FIG. 2. When the piston engages the second spring means 54, there is a substantial increase in the biasing force on the piston toward the clutch-disengaging position. The distance between the point of piston engagement with the second spring means and the point of full clutch engagement is established so that the piston will engage the second spring means when clutch engagement is impending, and there is just enough clearance in the stacked friction plates so that total engagement will not occur at that point. Thus, the total clearance distance depends on the number and the size of the friction plates. In the clutch utilized to illustrate the invention, it has been found that a distance of .060 inch between the second spring means engagement and the compression of the friction plates to their solid height produces satisfactory results; although, this dimension may be varied and the example referred to is not to be construed as limiting the invention.

The fluid pressure in the cylinder 24 which moves the piston is supplied by a pressure-regulated fluid pressure source 62, including a pump P, controlled by a valve means 64 having an inlet 66, communicating with the fluid-pressure source 62 via a hydraulic line 68, and an outlet 70 communicating with the cylinder 24 via a hydraulic line 72 and a clutch inlet 74.

The valve 64 is a pressure modulating type valve and is controlled by manual actuating means 76, here shown as a conventional clutch pedal connected to a valve plunger 78 by a rod 80 which exerts the actuating force on the plunger 78 through a modulating spring 82.

The plunger 78 moves axially in a valve cylinder 84 and has a radial end face 86 at one end. The cylinder is closed at the end opposite the end face 86 and forms a pressure chamber 88 which is connected to the outlet 70 by a passage 90. The manual actuating means 76 is biasing toward a valve-opening position by a clutch pedal return spring 92 as shown in FIG. 2. In this position, the actuating means is released to move the plunger 78 to the left in the drawings, closing a return outlet 94, which is connected to a reservoir 96 by a conduit 98, and uncovering the inlet 66 to convey the fluid pressure through the outlet 70 and line 72 to the clutch inlet 74.

In operation, to disengage the clutch, the actuating means 76 is depressed against the bias of the return spring 92, thereby moving the plunger 78 to the right as shown in FIG. 1. This movement closes the inlet 66 and then opens the return outlet 94 for exhaust of the fluid pressure in the clutch cylinder 24, the outlet line 72 and the chamber 88. Since there is no pressure in the cylinder 24, the first spring means 50 forces the piston 38 against the radial face 16 to allow the separation of the friction plates 30 and 34 and consequently disengage the clutch.

To engage the clutch, the operator gradually releases the actuating means which is biased toward an engaged position by the return spring 92, thereby moving the rod 80 to the left in the drawings. This movement is transmitted through the preloaded modulating spring 82 to the plunger 78. The initial movement closes the return outlet 94 and then immediately opens the inlet 66, transmitting fluid pressure through the outlet 70, fluid line 72 and clutch inlet 74 to the clutch cylinder 24.

The fluid pressure moves the piston 38 to the left against the bias of the first spring means 50, causing a fluid flow into the cylinder 24 and consequently a fluid-pressure drop between the outlet 70 and the cylinder. If the piston were allowed to move into engagement with the friction plates 30 and 34, the flow of fluid would cease when the friction plates were compressed to their solid height, terminaitng the pressure drop, whereby the pressure in the cylinder 24 would abruptly rise to equal the pressure at the outlet 70, resulting in an abrupt clutch engagement. However, the piston engages the second spring means 54 a relatively short distance before it can compress the friction plates into engagement, temporarily terminating the piston movement.

The modulating valve spring 82 is preloaded so that the valve 64 will not start to modulate until after a predetermined outlet pressure is reached. This pressure is sufficient to cause movement of the piston 38 against the second spring means 54 against the bias of the first spring means 50, but insufficient to move the piston against the combined biasing force of both spring means. Thus, the piston is moved into impending engagement upon the initial release of the actuating means.

When the outlet pressure reaches its predetermined value, the force created by the fluid pressure in the chamber 88 acting on the radial face 86 balances the force exerted by the preloaded modulating spring 82. Additional outlet pressure deflects the modulating spring and moves the plunger to the right to close the inlet. Further release of the actuating means again moves the plunger to the left, opening the inlet 66 until the increased pressure in the chamber 88 causes sufficient deflection of the modulating spring to again close the inlet. The outlet pressure is thus a function of the position of the actuating means.

After the piston engages the second spring means and the valve means 64 is in a modulating condition wherein the outlet pressure depends on the position of the actuating means, there is no fluid flow and consequently no pressure drop. The second spring means 54 is preloaded in order that the piston 38 will not move until the pressure in the cylinder 24 reaches a predetermined value which is substantially greater than the pressure at which modulation occurs to allow for the sudden increase in cylinder pressure due to the disappearance of the pressure drop. When the actuating means 76 is further released, and the cylinder pressure is sufficient to overcome the biasing effect of both spring means 50 and 54, the piston moves a short distance to compress the friction plates to their solid height. Since the movement is small, no substantial flow of fluid or pressure drop results. When the friction plates are compressed, additional fluid pressure in the cylinder causes the piston to exert an axial force on the plates which engages the clutch, the amount of torque transmitted being a function of the engaging force exerted by the piston. Since the force depends on the cylinder pressure which in turn depends on the position of the actuating means 76, the operator who controls the actuating means has the proper feel on the clutch and can control the rate of clutch engagement or increase or decrease the output torque.

When the actuating means 76 is fully released as shown in FIG. 2, a predetermined outlet pressure of the fluid pressure source is delivered to the cylinder 24, this pressure being set sufficiently high to insure clutch engagement at the full torque load on the clutch.

Although the member 10 is described herein as the drive member and the member 26 as the driven member, it is to be understood that the power flow could be reversed within the scope of the invention. Moreover, other features and advantages of the present invention will readily occur to those skilled in the art, as will many modifications and alterations of the preferred embodiment of the invention described herein, all of which may be achieved without departing from the spirit and the scope of the invention.

What is claimed is:

1. A hydraulically actuated friction clutch comprising a drive member, a driven member, a plurality of frictionally engageable clutch members operably connected to said drive and driven members for driving said members in unison when engaged, a hydraulic mechanism for effecting the engagement of said clutch members including a fixed and a movable member, means for supplying fluid under pressure to said hydraulic mechanism for moving said movable member into a clutch engaging position, a first spring means acting on the movable member and biasing it away from a clutch-engaging position, and a second spring means engaging said movable member only after some movement toward its clutch-engaging position at a predetermined distance from said engaging position to furnish additional biasing force.

2. The invention defined in claim 1 wherein the second spring means is preloaded to provide an abrupt increase in the biasing force when engaged by the movable member.

3. The invention defined in claim 2 wherein the movable member effects engagement of the clutch after moving a relatively short predetermined distance from the point of engagement with the second spring means.

4. A hydraulically actuated friction clutch comprising a drive member, a driven member, a plurality of frictionally engageable clutch members movable between engaged and disengaged positions and operably connected to the drive and driven members for movement of the drive and driven members in unison when the clutch members are engaged, hydraulic ram means for effecting engagement of the said clutch members, including a cylinder and a piston movable between clutch engaging and disengaging positions, a source of fluid pressure connected to said hydraulic ram means, valve means for controlling the fluid pressure in said ram means, a first spring means acting on the piston and biasing it toward the clutch disengaging position, and a second spring means engaging said piston only after same movement toward the clutch-engaging position for providing a substantial increment in the biasing force.

5. The invention defined in claim 4 wherein the valve means comprises a modulating type valve having its input connected to the pressure source and the output communicating with the hydraulic ram means, and having manually operated actuating means whereby the output pressure is responsive to the position of the actuating means.

6. The invention defined in claim 5 wherein the modulating type valve is actuated through a preloaded modulating spring whereby the initial actuation of the valve provides an outlet pressure sufficient to move the clutch piston into engagement with the second spring means against the biasing force of the first spring means, but insufficient to move the piston against the increased biasing force of the first and second spring means.

7. A hydraulically actuated friction clutch comprising a rotatable first member having a coaxial cup-shaped portion, a rotatable second member coaxially extending into the open end of said cup-shaped portion, a stack of annular friction plates, each plate being connected to the first or second member between the inner periphery of the first member and the outer periphery of the second member and being axially movable on said members between a disengaged position and an engaged position for the rotation of said members in unison, a hydraulic cylinder including a radial end wall defined by the interior of said cup-shaped portion, a piston acting within said cylinder and movable in response to hydraulic pressure in the cylinder between a clutch engaging position wherein it axially compresses the stacked clutch plates into their engaged position and a clutch disengaging position, means for supplying and controlling hydraulic pressure in said cylinder, a first spring means acting on the piston and biasing it toward a clutch disengaging position, and a second spring means engaging the piston during its movement toward the clutch engaging position a relatively short distance before it reaches said clutch engaging position, said second spring means being preloaded to provide an abrupt increase in the biasing force on the piston toward the clutch disengaging position.

8. The invention defined in claim 7 wherein the means for controlling the hydraulic pressure is a manually actuated modulating type valve whereby the output pressure is responsive to the position of the actuating means and the initial actuation of the valve provides an outlet pressure sufficient to move the clutch piston into engagement with the second spring means against the biasing force of the first spring means but insufficient to move the piston against the increased biasing force of the first and second spring means combined.

9. A hydraulically actuated friction clutch comprising a rotatable first member having a coaxial cup-shaped portion, a rotatable second member coaxially extending into the open end of said cup-shaped portion, a stack of annular friction plates alternately connected to the first and second member between the inner periphery of the cup-shaped portion and the outer periphery of the second member and axially movable between a disengaged position and an engaged position for driving the members in unison, a hydraulic cylinder defined by said cup-shaped portion, a piston acting within said cylinder and movable in response to fluid pressure in the cylinder between a clutch engaging position wherein it positively engages and axially compresses the stacked friction plates and a clutch disengaging position, a source of fluid pressure, a modulating type valve having its inlet connected to the fluid pressure source and its outlet to the hydraulic cylinder, and having manually controlled valve actuating means whereby the outlet pressure is responsive to the position of the actuating means, a first spring means acting on the piston for biasing the piston toward its clutch disengaging position, a second spring means preloaded and engaging the piston during its movement toward its clutch engaging position a relatively short distance before reaching said position for providing a substantial increment in the biasing force on the piston toward its clutch disengaging position.

10. The invention defined in claim 9 wherein the modulating type valve is actuated through a preloaded modulating spring and the initial actuation of the valve provides an outlet pressure sufficient to move the clutch piston into engagement with the second spring means against the biasing force of the first spring means but insufficient to move the piston against the increased biasing force of the first and second spring means combined.

11. A hydraulically actuated frictional clutch comprising a rotatable first member having an axial shaft portion and a coaxial cup-shaped portion defining a cylinder open at one end, a rotatable second member coaxially extending into the open end of said cup-shaped portion, a stack of annular friction plates alternately connected to the first and second members between the inner periphery of the cup-shaped portion and the outer periphery of the second member and axially movable between a disengaged position and an engaged position for driving the members in unison, an annular piston axially slidable on the shaft portion within said cylinder and movable in response to fluid pressure in the cylinder between a clutch engaging position wherein it compresses the stacked friction plates and a clutch disengaging position, a retaining member mounted on said shaft portion, stop means on said shaft, a sleeve axially slidable along said shaft between the retaining member and the stop means, a first helical compression spring coaxially mounted around the shaft portion and extending between the piston and the retaining member for biasing the piston toward its clutch disengaging position, a second helical compression spring coaxially mounted around the shaft portion and extending between the retaining member and the sleeve for biasing the sleeve against the stop means, the piston engaging the sleeve a short distance before reaching its clutch engaging position, the second spring means providing an increment in the biasing force on the piston, a source of fluid pressure connected to said cylinder, and valve means for controlling the fluid pressure in said cylinder.

References Cited by the Examiner

UNITED STATES PATENTS

| | | | |
|---|---|---|---|
| 794,899 | 7/1905 | Sturtevant et al. | 192—85 |
| 2,736,412 | 2/1956 | Livezey | 192—85 |
| 3,213,984 | 10/1965 | Cook | 192—85 |

FOREIGN PATENTS 553,603  5/1943  Great Britain.

BENJAMIN W. WYCHE, III, *Primary Examiner.*